United States Patent [19]
Niesse

[11] 4,370,355
[45] Jan. 25, 1983

[54] METHODS OF AND APPARATUS FOR COATING LIGHTGUIDE FIBER

[75] Inventor: Paul J. Niesse, Atlanta, Ga.

[73] Assignee: Western Electric Company, Inc., New York, N.Y.

[21] Appl. No.: 291,866

[22] Filed: Aug. 10, 1981

[51] Int. Cl.³ .......................... B05D 1/26; G02B 5/14
[52] U.S. Cl. ......................................... 427/9; 427/10; 427/163; 118/665; 118/672
[58] Field of Search .................... 427/9, 10, 163; 118/665, 672

[56] References Cited

U.S. PATENT DOCUMENTS

| 19,316 | 2/1858 | Thayer et al. | |
|---|---|---|---|
| 1,776,073 | 9/1930 | Girard et al. | |
| 2,314,168 | 3/1943 | Smith | |
| 2,952,240 | 9/1960 | Abbott | |
| 3,907,536 | 9/1975 | Ackenar | |
| 4,156,044 | 5/1979 | Mracek et al. | |
| 4,208,200 | 6/1980 | Claypoole et al. | |
| 4,246,299 | 6/1981 | Ohls | 427/54.1 |
| 4,314,834 | 2/1982 | Feenstra et al. | 65/11.1 |
| 4,321,072 | 3/1982 | Dubos et al. | 427/10 X |

*Primary Examiner*—James R. Hoffman
*Attorney, Agent, or Firm*—E. W. Somers

[57] ABSTRACT

A drawn lightguide fiber is coated with a layer of a plastic material by moving the fiber through a container of the coating material and a die. The die is made of a relatively flexible material and is mounted so that a lower end extends through an opening of a diaphragm which is adapted to apply substantially coplanar forces to the lower end of the die to reduce the size of an exit orifice. The coating on the fiber is measured and if necessary, as a result of that measurement, the diaphragm is adjusted either manually or automatically to change the size of the die orifice and provide a coated fiber having a predetermined diameter.

9 Claims, 10 Drawing Figures

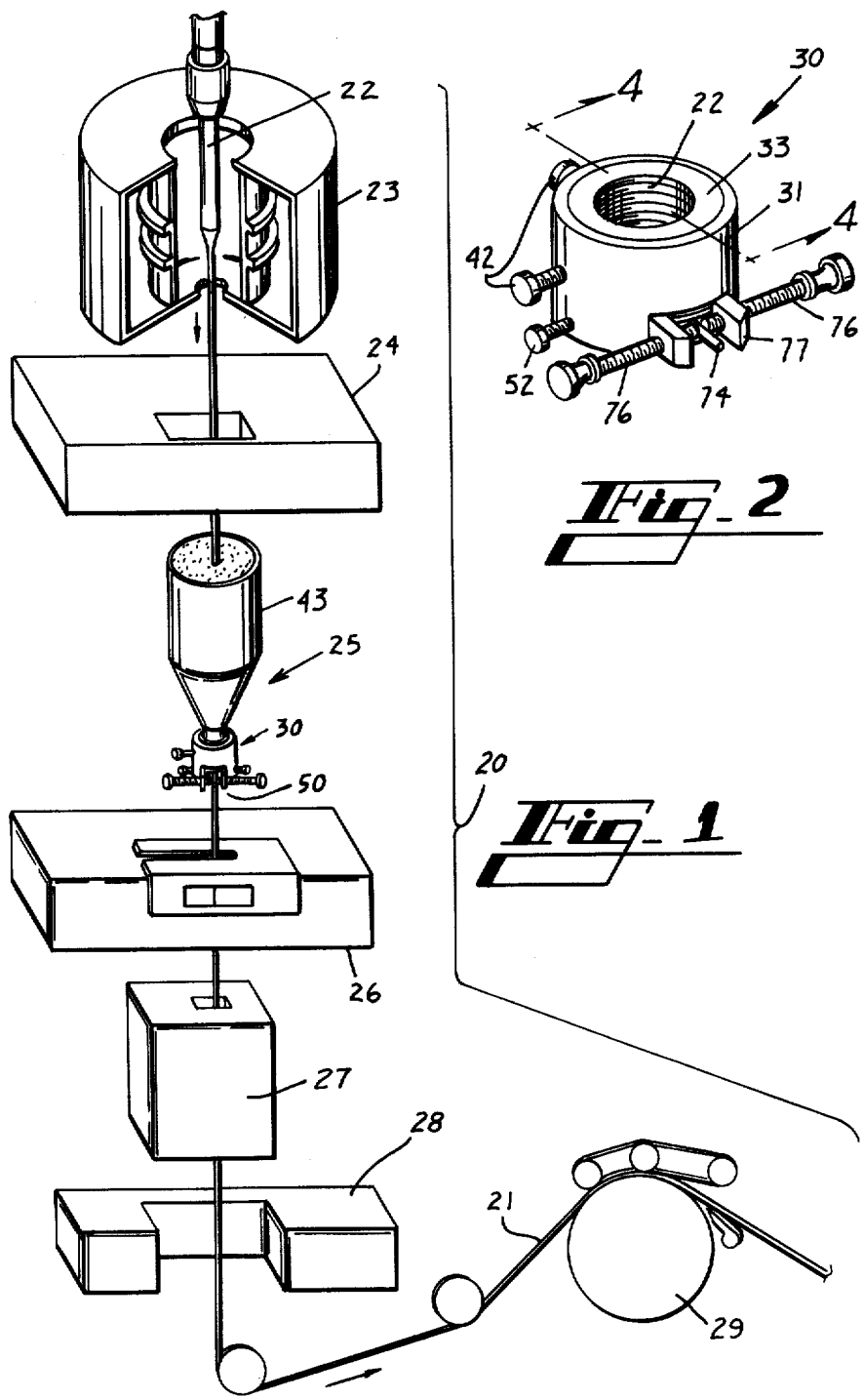

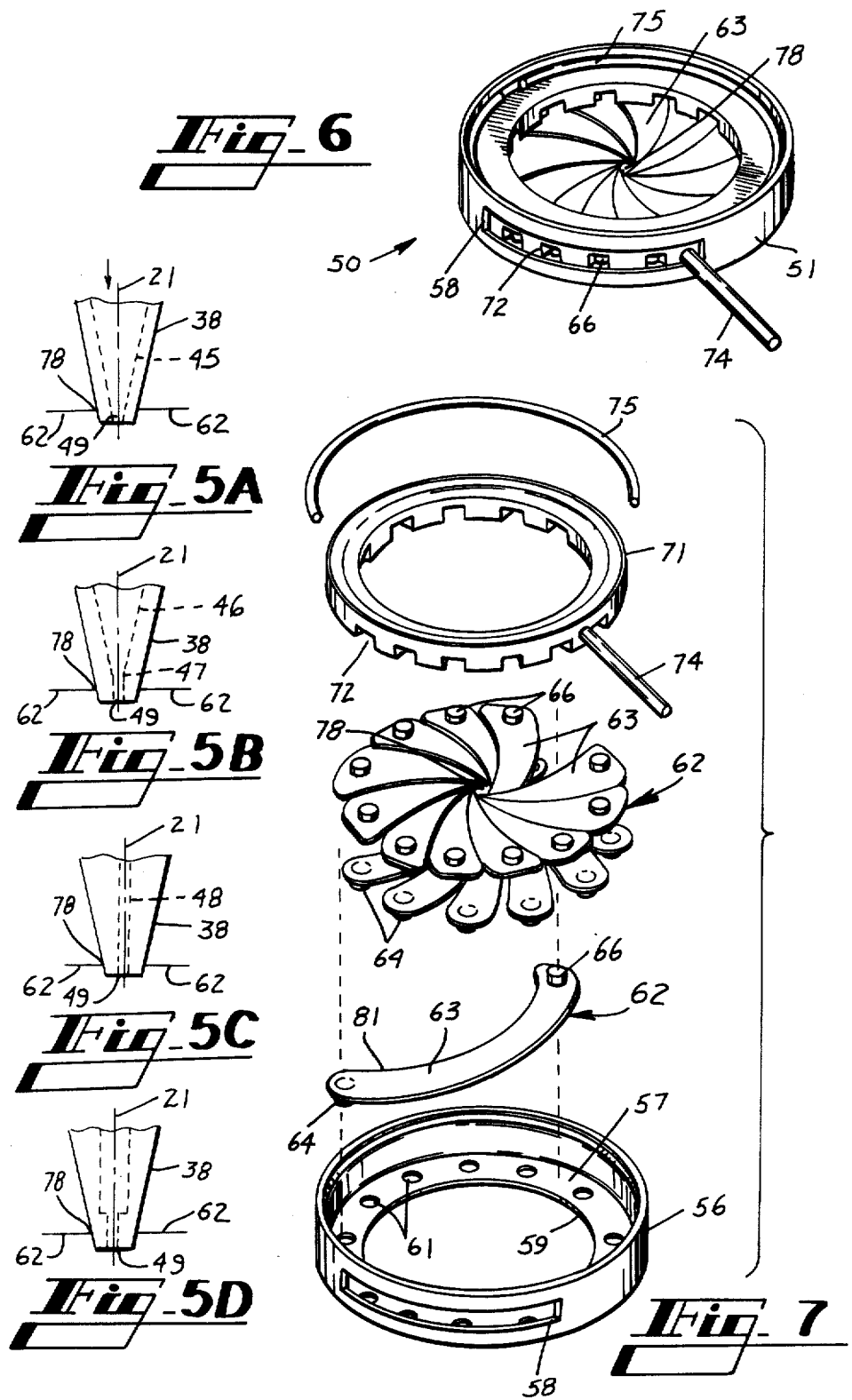

METHODS OF AND APPARATUS FOR COATING LIGHTGUIDE FIBER

TECHNICAL FIELD

This invention relates to methods of and apparatus for coating lightguide fiber. More particularly, it relates to methods of and apparatus for applying a coating to a lightguide fiber after it has been drawn from a preform but before it has been taken up on a spool.

BACKGROUND OF THE INVENTION

In one manufacturing process, lightguide fiber having a diameter of about 0.013 cm is drawn from a vertically suspended, heated glass preform and is taken up on spools. The spools are used to supply subsequent operations, such as ribboning in which a plurality of fibers are arrayed contiguously in a planar array. To satisfy system demands, lightguide fiber must have certain attributes, one of which is relatively high strength. It is essential that the strength of the fiber be preserved during and after the drawing operation.

The preservation of the strength of the fiber is accomplished by the application of a relatively thin layer of an organic or an inorganic coating material immediately after drawing. This coating which has a thickness of about 0.005 cm serves to prevent airborne particles from impinging upon and adhering to the surface of the drawn fiber which would weaken it. Also, the coating shields the fiber from surface damage which would be inflicted during subsequent manufacturing process and during installation.

It is important in the production of a drawn fiber that the coating process provide a coating having required properties. Important properties relating to the coating are its thickness, which determines the diameter of the coated fiber, its centering or concentricity, and the proper curing of the material which comprises the coating. An off-centered fiber in the coating may not adequately cover or protect the fiber surface which could have an adverse effect on fiber strength and microbending loss.

The thickness of the coating is important not only from the standpoint that it is sufficient to adequately cover and protect the surface of the fiber, but also that it is not so thick that it impairs subsequent manufacturing operations and/or connectorization. Too large a coated fiber diameter will cause the coated fiber undesirably to adhere to a subsequently tube extruded jacket of a single lightguide fiber cable. Also, in ribboning, fibers having an excessively thick coating will cause lateral displacement of contiguous fibers thereby unduly stressing the fibers as well as causing misalignment of those fibers in the array with fibers of another array during connectorization.

In one apparatus, fibers are coated as they are passed downwardly vertically from a drawing furnace and through an applicator containing a viscous liquid coating material. As the liquid coating material is drawn from the applicator by the moving fiber, it is replenished from an elevated reservoir by actuation of a valve in response to sensed levels of the coating material.

The drawing process as well as a coating process are disclosed in an article by D. H. Smithgall and D. L. Myers entitled "Drawing Lightguide Fiber" which appeared on pages 49–61 of the Winter 1980 issue of *The Western Electric Engineer* and which is incorporated by reference hereinto. Coating applicators are disclosed in U.S. Pat. No. 4,246,299 and in commonly assigned application Ser. No. 265,713 filed May 20, 1981 in the name of Rama Iyengar.

A typical coating applicator includes a die which depends from a reservoir cup having an open top and through which the drawn fiber is advanced. The diameter of the orifice of the die, which generally has been made of a relatively flexible material, is fixed at approximately two times the outer diameter of the uncoated fiber.

These are problems associated with the use of the fixed size orifice for applying a coating material on a drawn fiber. Unfortunately, the fixed size die does not permit adjustments to compensate for variables such as the level of the coating material in its applicator cup, changes in line speed, viscosity of the coating material, and wear or inaccuracies of die manufacture. Should the draw speed of the fiber be changed, the orifice in the die can become quickly flooded or starved. This has been a limiting factor on the utility of this type of coating apparatus where different coating materials and different draw speeds are contemplated. Also, the die cannot be easily cleaned or made serviceable without stopping the drawing operation.

Another problem comes about during the start-up of the drawing of the lightguide fiber from the preform which is suspended vertically above the coating die and a drawing furnace. During start-up with a fixed orifice die, an operator strings up the draw apparatus by pulling a lower portion of the preform downwardly through the furnace and threading it through measuring devices and through the coating apparatus. The portions of the preform which are strung up by the operator are at an elevated temperature and are enlarged relative to the drawn fiber. They cause the tip of the die to melt and form an unduly large opening. As a result, the amount of coating material which is applied to the fiber is greater than that desired.

As for the prior art, Thayer and Martin in their U.S. Pat. No. 19,316 show an article being moved through a wiper which is surrounded by a rubber strap having wraps displaced longitudinally along the article. The elasticity of the strap when tightly drawn causes it to closely contact the wiper, always fitting it to the article moving therethrough and wiping off surplus coating. Such an arrangement is completely unsuitable for coating lightguide fiber since the strap tends to twist or skew the wiper as it is pulled taut. This tends to deform the inner diameter inasmuch as the forces are not applied evenly and circumferentially around the periphery of the fiber at any point along its length.

A need remains for methods and apparatus for coating lightguide fibers by which the diameter of the coated fiber can be maintained within a range while the previously mentioned variables are changing. Seemingly this need has not been addressed by the prior art.

SUMMARY OF THE INVENTION

The foregoing need has been met by the methods and apparatus of this invention. Included in a method of coating lightguide fiber are the steps of providing a container of a coating material and providing a die having a passageway which communicates with the container. A tip of the die has an orifice in a plane which is normal to a path along which a lightguide fiber is advanced. Also, the orifice of the die from which the fiber exits is capable of being charged in cross-sectional area and configuration in response to the controlled application of forces about the periphery of the die. A lightguide fiber that has been drawn from a preform and that has a circular cross-section is moved along a path which extends through the container and the die to cause the fiber to be coated with a layer of the coating material. Afterwards, the diameter of the coated fiber is measured and if necessary as a result of that measurement, forces which are applied to the periphery of the die are controlled to adjust the size and/or the configuration of the opening to cause the coating to be of a predetermined diameter.

The forces which are applied to the periphery of the die are directed inwardly and are substantially coplanar in order to avoid any canting of the surfaces which define the die orifice. This manner of application of the forces is especially important in view of the diameter of the uncoated fiber. If the forces were applied over some distance as measured along the length of the fiber, there would be a greater likelihood of diameter variation in the coated fiber.

The above-described arrangement is advantageous from several standpoints. First, the arrangement permits the flushing of foreign matter in the tip of the die. This only requires that the die orifice be opened to a diameter substantially greater than that required to coat the lightguide fiber for a short period of time. After any foreign matter has been flushed through the die tip, forces are again applied to the die in order to provide a coating of the desired diameter. Also, the capability of being able to control the die orifice permits adjustments to compensate for the previously identified variables such as line speed. The capability of enlarging the die orifice facilitates operator string-up and overcomes the hereinbefore-described problem of deformation of the die by heat during the start-up of the drawing operation.

BRIEF DESCRIPTION OF THE DRAWINGS

Other features of the present invention will be more readily understood from the following detailed description of specific embodiments thereof when read in conjunction with the accompanying drawings, in which:

FIG. 1 is a perspective view of an overall arrangement for drawing lightguide fiber from a preform which is suspended vertically and the apparatus of this invention for coating the drawn lightguide fiber;

FIG. 2 is a perspective view of the coating apparatus of this invention for applying a coating to the drawn lightguide fiber;

FIGS. 5A-5D are views of embodiments of a die of the coating apparatus;

FIG. 6 is an enlarged view of one arrangement for applying forces to the die; and FIG. 7 is an exploded view of the arrangement which is shown in FIG. 6.

DETAILED DESCRIPTION

Figure 4:
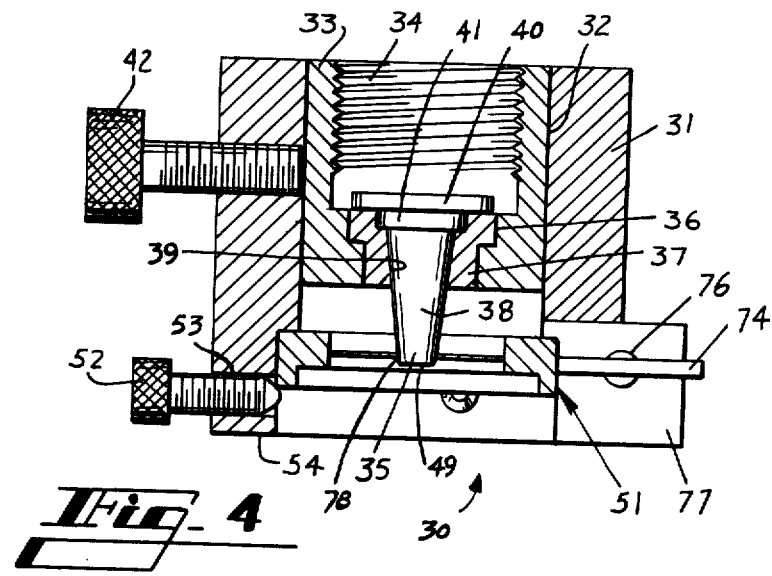
FIG. 4 is a cross-sectional view of the coating apparatus of FIG. 3 and taken along lines 4—4 thereof.

Referring now to FIG. 1, there is shown an apparatus which is designated generally by the numeral 20 and in which is used to draw a lightguide fiber 21 from a specially prepared cylindrical preform 22 and for then coating the fiber. The lightguide fiber 21 is formed by locally and symmetrically heating the preform 22 typically 7 to 25 mm in diameter and 60 cm in length to a temperature of about 2000° C. As the preform is fed into and through a furnace 23, fiber 21 is drawn from the molten material.

As can be seen in FIG. 1, the elements of the draw system include the furnace 23 wherein the preform is drawn down to the fiber size after which the fiber 21 is pulled from the heat zone. The diameter of the fiber 21 is measured by a device 24 at a point shortly after the fiber is formed and this measured value becomes an input into a control system. Within the control system, the measured diameter is compared to the desired value and an output signal is generated to adjust the draw speed such that the fiber diameter approaches the desired value.

After the diameter of the fiber 21 is measured, a protective coating is applied to it by apparatus 25 of this invention. Then, after the coated fiber 21 passes through a centering gauge 26, a device 27 for treating the coating and a device 28 for measuring the outer diameter of the coated fiber, it is moved through a capstan 29 and is spooled for testing and storage prior to subsequent cable operations. The preservation of the intrinsically high strength of lightguide fibers is important during the ribboning, jacketing, connectorization and cabling of the fibers and in their service lifetime.

In order to satisfy communication system requirements, the lightguide fiber must be characterized by low loss, a capacity for transmitting information at a high rate, precise geometrical control and relatively high strength. These properties are very dependent on the preform fabrication process. The fiber drawing process can affect the strength of the fiber, its attenuation and the diameter variation along its length. In order to maintain high quality of the fiber 21, it is essential that these attributes be preserved during drawing.

Preservation of fiber strength requires the application of the protective coating, which shields newly drawn fiber from the deleterious effects of the atmosphere. This coating must be applied in a manner that does not damage the surface of the fiber 21 and such that the fiber has a predetermined diameter and is protected from abrasion during subsequent manufacturing operations, installation and service. Minimizing attenuation requires the selection of a suitable coating material and a controlled application of it to the fiber. Minimizing diameter variation which in turn minimizes the losses due to misalignment at connector and splice points requires careful design of the draw system and the continuous monitoring and control of the fiber diameter during the drawing and the coating steps of the process.

The coating process is a critical step in the drawing process. At typical draw speeds in the range of ½ to 1½ meters per second, important factors related to coating are the diameter control of the coated fiber 21, the centering of the fiber in the coating, and the suitable treating of the coating material. An off-centered fiber 21 in the coating may damage the fiber surface during the coating process and can have an adverse effect on fiber strength and microbending loss. In addition to these factors, there are problems associated with fiber temperature. The fiber 21 must be cooled from the 2000° C. temperature of the furnace 23 to below 300° C. at the coating apparatus 25. It has been found that the coating material deteriorates when this temperature is exceeded. At present draw speeds, the fiber 21 cools sufficiently in the air space between the furnace 23 and the coating apparatus 25 while at higher draw speeds, auxiliary cooling of the fiber may be necessary to prevent coating material deterioration.

The treating of the coating material depends upon the type of material used which generally is one of three classes. One class of these materials includes a group of polymer epoxy acrylates which is cured by ultraviolet radiation. A second class, thermo-setting materials such as silicone, is cured by infrared radiation while a third includes solvent-based materials such as lacquers. The epoxy acrylate materials are cured by passing the coated fibers through an ultraviolet curing lamp system. The thermo-setting and solvent-based materials are thermally cured by passing the coated fiber through an oven.

Figure 3:
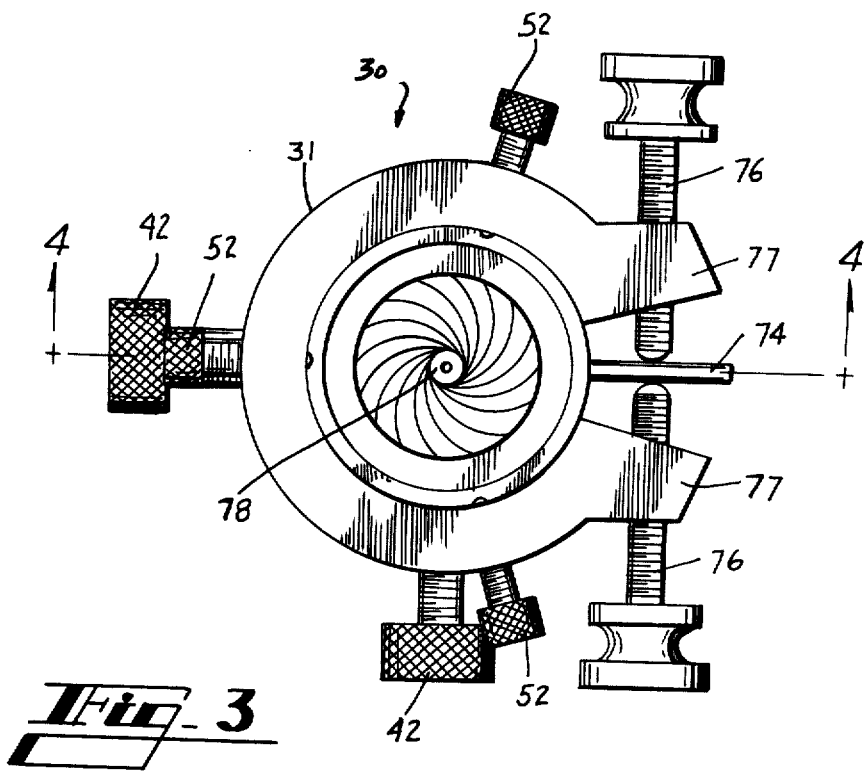
FIG. 3 is a plan view of the coating apparatus of this invention.

Going now to FIGS. 2-4, there is shown a cross-sectional view of the coating apparatus 30 of this invention. The apparatus 25 includes a housing 31 having an opening 32 formed therethrough. Positioned within the opening 32 is a relatively large nut 33 having an internally threaded bore 34. The housing 31 is supported so that its centerline is aligned vertically with the centerline of the preform 22 which is suspended above the furnace 23.

The nut 33 includes a stepped bore 36 at its lower end in which is received a nut insert 37. A conically shaped coating die 38 is received within a stepped bore 39 of the nut insert 37 with its smaller diameter portion 35, which is referred to as the tip, depending downwardly. The coating die 38 has one flange 40 which is supported on the insert 37 and another flange 41 which is received within the stepped bore 39. In order to hold the nut 33 within the housing 31, one or more fasteners 42—42 are turned threadably through an opening of the housing into engagement with the nut.

Mounted above the housing 31 is a coating cup 43 (see FIG. 1) which has a threaded nozzle depending downwardly therefrom. The cup 41 is designed to retain the material which is used to coat the lightguide fiber. The nut 33 is designed to be turned onto the threaded nozzle of the cup 41. When the nut 33 is turned onto the threaded nozzle, torsional forces tend to be applied to the coating die 38. The function of the nut insert 37 is to absorb these torsional forces and to transmit them to the nut 33. In this way the torsion on the coating die 38 is minimized thereby preventing damage thereto.

The coating die 38 includes a passageway 45 (see FIGS. 5A-5D) through which the fiber 21 is moved. The passageway 45 which generally has a circular cross-section, may be tapered (see FIG. 5A) while in a preferred embodiment it includes a tapered upper portion 46 which leads into a uniform diameter land portion 47 (see FIG. 5B). In FIG. 5C, a passageway 48 is cylindrical while a passageway in FIG. 5D is stepped. Whatever the configuration of the passageway, an orifice 49 at at its lower end, from which the fiber 21 exits the die, has a diameter in the range of about 0.025 cm to cause the 0.013 cm fiber to have a coated diameter of about 0.023 cm.

Provisions are made for restricting or enlarging the die orifice 49 in order to control the diameter of the coated fiber 21. As will be recalled, this is necessary in order to compensate for variables such as level of the coating material in the cup 43, viscosity of the coating material, changes in line speed, and wear or inaccuracies of tip manufacture.

In order to accomplish this, the coating die 38 is made of a material which is capable of reforming from an initial configuration under the application of forces and of returning to the initial configuration upon relaxation and/or removal of the forces. The reforming and the returning of the die 38 causes the diameter of the die orifice 49 to be reduced and to be increased, respectively. Moreover, the material of the die 38 must be such that these changes can be made repetitively during the drawing operation. In a preferred embodiment, the coating die 38 is made of a relatively flexible material which is marketed by the Dow Corning Corporation, Midland, Michigan under the designation Silastic® silicone rubber. It has been found that a TUFEL* silicone rubber as marketed by the General Electric Company is also an acceptable material for the die 38.

This capability of changing the die orifice 49 is further accomplished by means of a device which is designated generally by the numeral 50 (see FIG. 1). That device is basically an iris diaphragm which is mounted in a ring holder 51 and which is supported in a lower portion of the housing 31. The ring holder 51 is maintained in a desired circumferential position by a plurality of fasteners 52 which are turned threadably through openings 53 in a lower portion 54 of the housing 31.

Going now to FIGS. 6 and 7, there is shown the construction of the iris diaphragm 50. As can be seen, the diaphragm 50 includes a base ring 56 which includes an annular portion 57 having a wall 58 extending upwardly from a periphery of the annular member 56. The annular member includes a centrally disposed opening 59 and a plurality of smaller openings 61 which are spaced apart within the annular portion 57.

The iris diaphragm 50 is designed so that a portion of the opening 59 is designed to be restricted or expanded at the instance of an operator or by a feedback control system. As can be seen from the drawings, a plurality of diaphragm leaves 62—62 are mounted on the annular portion 57. Each of the diaphragm leaves 62—62 includes an arcuate portion 63 having pins 64 and 66 of relatively small height protruding in opposite directions from the ends thereof. Each of the leaves 62—62 is positioned on the annular portion 57 so that the pin 64 at one end thereof is received in one of the openings 61. In this way the pin 66 at the other end of each one of the diaphragm leaves 62—62 extends upwardly from the annular portion 57 and these are spaced about a circle above the annular portion.

To complete the diaphragm 50, a second annular member 71 having a plurality of radially formed slots 72—72 therein is mounted in the base ring 56 above the diaphragm leaves 62—62. The second annular member 71 is positioned above the diaphragm leaves 62—62 such that the second pin 66 of each one of the leaves is received in an associated one of the slots 72—72 formed in the second annular member. Further, the second annular member 71 has an actuating lever 74 extending radially therefrom. The second annular member 71 and the leaves 62—62 are held in the base ring 56 by a retention ring 75.

The diaphragm 50 is such that the leaves 62—62 are capable of being moved simultaneously to decrease or to increase the size of the die orifice 49 through which the coated fiber 21 exits the apparatus 25. When the pins 66—66 are moved arcuately in one direction to one extreme position, an opening 78 which is provided among the leaves 62—62 at the centerline of the member 71 is relatively small. At the other extreme and at positions between the two extremes reached by the movement of the pins in an opposite arcuate direction, the opening 78 (see FIGS. 4 and 6) formed among the leaves 62—62 is increased.

The lower end 35 of the die 38 extends into the opening 78 formed among the leaves 62—62. Movement of the leaves 62—62 in one direction causes the leaves to impart forces to the lower end of the die to decrease the size of the orifice 49. Movement in the other direction relaxes the forces applied to the die thereby allowing the lower end of the die 38 to return to or toward its undeformed shape and the orifice 49 at its lower end to increase.

As can be seen in FIG. 3, the actuating lever extends between two locking and gauging pins 76—76. The locking pins 76-76 extend through openings in ears 77—77 of the housing 31. By presetting the pins 76—76, the extent to which the iris die is capable of being opened and closed is established.

In operation, the actuating lever 74 is moved pivotally in either a clockwise or counterclockwise direction and may be locked in a desired position by appropriate positioning of the pins 76—76. The movement of the lever 74 causes movement of the second annular member 71 which in turn applies forces to the second pins 66—66 of each one of the leaves 62—62. This in turn causes the leaves 62—62 to move pivotally about the first ones of the pins 64—64 of each of the leaves in order to restrict or to expand the opening 78 through the diaphragm. It should be observed that the second pin of each leaf 62 is caused to move within its associated slot 72 as the actuating lever 74 is moved. Depending on the direction of movement of the actuating lever 74, each pin is moved in one arcuate direction or another while moving within its slot.

With the device 50 in position, the depending tip 35 of the die 38 extends through the opening 78 which is formed by the diaphragm leaves 62—62. Then, when the lever 74 is moved either by an operator or a programmable feedback controller, the leaves 62—62 apply increased or decreased inwardly directed forces uniformly about the periphery of the coating die 38 adjacent the orifice 49 thereby causing the tip to be further restricted or relax the forces which are applied to enlarge the die orifice. For example, in the event that insufficient coating material is being applied to the lightguide fiber 21 or in the event that the draw speed is increased, then the lever 74 is operated in a reverse fashion in order to increase the opening 78 which is formed through the diaphragm leaves 62—62.

Advantageously, the forces which are applied by inner edge surfaces 81—81 of the leaves 62—62 are substantially coplanar as well as being substantially equal and substantially uniformly distributed. This avoids any bending of the coating die in a direction along the axis of the fiber 21. Because of the iris diaphargm arrangement, a different portion of the inner edge surface 81 engages the tip at different size openings of the diaphragm depending on the position of the actuating lever 74.

While in the preferred embodiment of this invention, the device 50 applies substantially equal forces which are uniformly distributed about the tip 35, the invention is not so limited. If the tip 35 were not circular in cross-section and were oblong, for example, the applied forces would not be uniformly distributed. They would be applied, however, in a controlled manner to cause the orifice 49 to be substantially symmetrical with respect to an X-Y coordinate system to produce a coated fiber having a predetermined diameter.

The construction of the device 50 must be such that it does not damage the tip 35 during closing thereon. In order to avoid this, the smaller radius edges of each of the leaves 62—62 is dulled or rounded. In the alternative, the leaves could be constructed from sheet stock which is thick enough to provide a formable non-cutting edge.

The apparatus of this invention permits a periodic flushing of the coating apparatus. For example, if foreign particles have accumulated within the cup or drool has accumulated about the depending tip 35 of the silicone rubber die 38, flushing may be in order. In either event, the takeup mechanism is operated to cause the takeup of the fiber 21 to be transferred to a scrap spool after which the lever 74 is operated to increase the opening 78 through the diaphragm leaves 62—62 to its non-deformed size of about 0.038 cm. This causes substantial amounts of the coating material to be flushed through the die orifice 49. After flushing, the lever 74 is operated to restrict the size of the die opening to about 0.025 cm after which the takeup mechanism is controlled to cause the fiber takeup to be transferred from the scrap spool to a useable spool.

The apparatus 25 of this invention also has substantial utility with respect to start-up of the lightguide fiber apparatus. Once the preform 22 is suspended within the drawing apparatus, an operator causes the lower depending portion of it to be positioned within the furnace 23 after which the melted tip thereof is pulled downwardly and strung up through the remainder of the apparatus. In order to avoid any damage to the silicone rubber die 38 on start-up, the lever 74 is operated to increase the opening through the diaphragm leaves 62—62. After string-up and after the apparatus is controlled to begin the draw operation, the lever 74 is moved in the reverse direction in order to cause the leaves 62—62 to restrict the orifice 49 through the coating die 35 to provide the required coated fiber diameter.

It is to be understood that the above-described arrangements are simply illustrative of the invention. Other arrangements may be devised by those skilled in the art which will embody the principles of the invention and fall within the spirit and scope thereof.

What is claimed is:

1. A method of coating lightguide fiber to provide a coated fiber having a predetermined diameter, said method including the steps of:

providing a supply of coating material;

providing a die having a passageway which communicates with the supply of the coating material, the die having an orifice which is disposed in a plane normal to the fiber and which is capable of being changed in cross-sectional size and configuration by the controlled application of forces about the periphery of the die;

moving a lightguide fiber along a path which extends through the passageway of the die to cause the fiber to be coated with a layer of the coating material;

measuring the diameter of the coated fiber; and in response to the step of measuring the diameter of the coated fiber, regulating the orifice by applying substantially coplanar forces in a controlled manner about the periphery of the die to cause the coated fiber to have the predetermined diameter.

2. The method of claim 1 wherein said forces are substantially equal and are uniformly distributed in a plane about the outer periphery of the die adjacent to the orifice.

3. The method of claim 1, wherein said forces are applied through corresponding portions of a plurality of substantially planar members which are moved simultaneously individually to increase or to decrease the forces which are applied to the die.

4. The method of claim 3, wherein as the planar members are moved to increase or to decrease the forces, different corresponding portions of the planar members engage the periphery of the die.

5. Apparatus for coating lightguide fiber, said apparatus comprising:
   a die having a passageway extending therethrough from an entrance end to an exit orifice, said die being made of a material which is sufficiently flexible to allow the cross-sectional size and configuration of the orifice to be changed by the controlled application of forces about the periphery of an end of said die which is adjacent to said exit orifice;
   holding means for supporting the die aligned with a path of travel of the fiber;
   means for supplying a coating material to said die;
   moving means for advancing the fiber through said die along a path of travel which is aligned with said passageway to cause the fiber to be coated with the coating material;
   means for measuring the diameter of the coated fiber; and
   means actuated in response to the measured diameter of the coated fiber for applying forces in a controlled manner substantially in a plane about the periphery of the end of said die which is adjacent to said exit orifice to regulate the size and configuration of said orifice and cause the coated fiber to have a predetermined diameter.

6. The apparatus of claim 5, wherein said passageway is tapered to cause its diameter to decrease in the direction of travel of the lightguide fiber.

7. The apparatus of claim 5, wherein said passageway includes in the direction of travel of the fiber a first portion having a constant diameter and a second portion which communicates with the first portion and which has a diameter that decreases in the direction of the path of travel of the fiber.

8. The apparatus of claim 5, wherein said die includes a flange and said holding means includes a housing having a mounting portion threadably turned thereinto, said mounting portion having an opening therethrough for receiving said die with said flange of said die engaging said portion.

9. The apparatus of claim 8, wherein said means for applying forces includes:
   a first annular member having a plurality of openings formed through the annular member and disposed in spaced relation to one another about the periphery of a circle;
   a plurality of arcuately shaped leaves, each of said leaves having a first pin extending in one direction from one end and a second pin extending from the other end in an opposite direction, said leaves being supported in said first annular member such that said first pin of each is received in one of said plurality of openings; and
   a second annular member having a plurality of slots formed radially therethrough, said second annular member being mounted on said first annular member such that the second pin of each of said leaves is received in one of said slots, said leaves being disposed between said first and second annular members to provide an opening which is aligned with the path of travel of the fiber, said die being mounted such that said end of said die which is adjacent to said exit orifice of said passageway extends through said opening among said leaves; and
   means for turning said second annular member relative to said first to cause the other end of each of said leaves to be mounted in an arcuate circumferential direction to restrict or to enlarge said opening which is formed by said leaves.

* * * * *